United States Patent [19]

Akiyama et al.

[11] 4,115,762
[45] Sep. 19, 1978

[54] ALIGNMENT PATTERN DETECTING APPARATUS

[75] Inventors: Nobuyuki Akiyama; Yoshimasa Oshima, both of Yokohama, Japan

[73] Assignee: Hitachi, Ltd., Japan

[21] Appl. No.: 856,096

[22] Filed: Nov. 30, 1977

[30] Foreign Application Priority Data

Dec. 1, 1976 [JP] Japan ................................ 51-143355

[51] Int. Cl.² .............................................. G01J 1/20
[52] U.S. Cl. ............................. 340/146.3 H; 250/201;
340/146.3 Q; 364/559
[58] Field of Search ............... 340/146.3 H, 146.3 Q, 340/146.3 AQ, 146.3 P, 146.3 F; 250/221, 201; 364/559

[56] References Cited

U.S. PATENT DOCUMENTS

| 3,603,728 | 9/1971 | Arimura | 340/146.3 H |
| 3,617,751 | 11/1971 | Levy et al. | 250/201 |
| 3,852,573 | 12/1974 | Dolch | 340/146.3 H |
| 3,955,072 | 5/1976 | Johannsmeier | 364/559 |

OTHER PUBLICATIONS

Bradsell et al., "Development of the Photoelectric Microscope," *Instrument Practice*, Nov., 1965. pp. 1011-1018.

*Primary Examiner*—Leo H. Boudreau
*Attorney, Agent, or Firm*—Craig & Antonelli

[57] ABSTRACT

An alignment pattern detecting apparatus comprises an image pick-up device for scanning and picking up an optical image of alignment pattern formed on a wafer to produce a time-base video signal, and means for sampling at predetermined intervals and converting from analog to digital form the video signal produced by the image pick-up device so that the video signal is returned symmetrically at a predetermined point to determine the degree of matching between the two signals thereby to obtain a point where the degree of matching is the best. This best matching degree point is detected as the center position of the alignment pattern.

5 Claims, 23 Drawing Figures

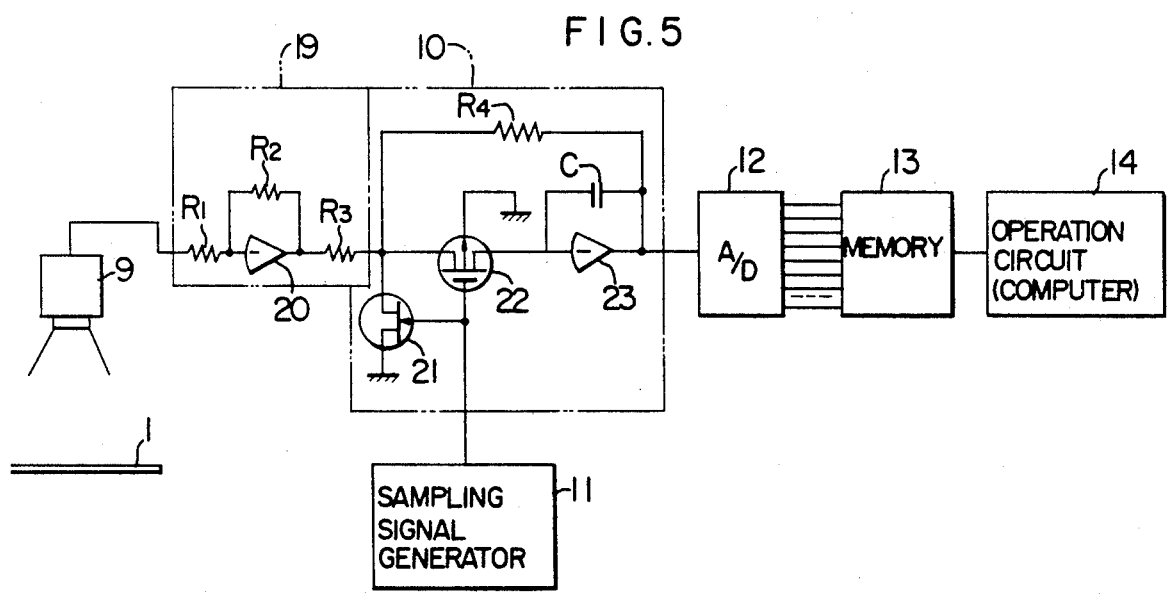
FIG. 5
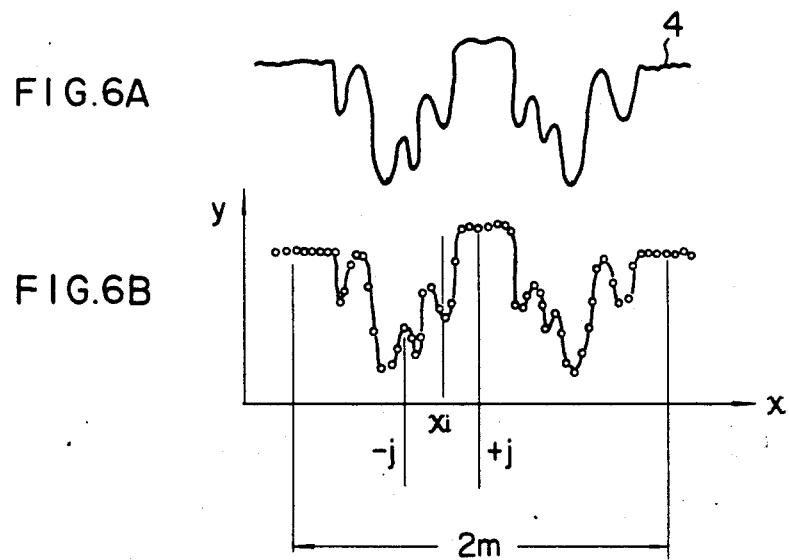
FIG. 6A
FIG. 6B
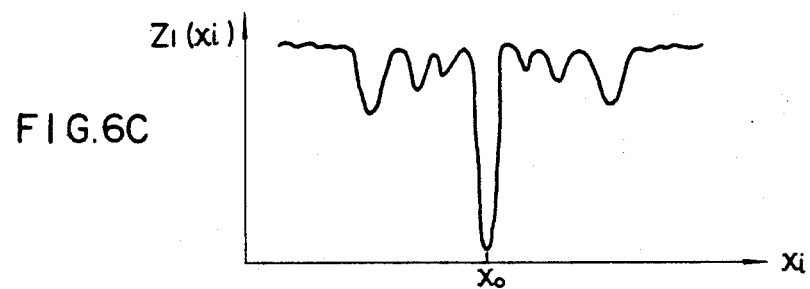
FIG. 6C

ALIGNMENT PATTERN DETECTING APPARATUS

LIST OF PRIOR ART REFERENCES (37 CFR 1.56(a))

The following references are cited to show the state of the art:

(1) U.S. Pat. No. 3,617,751 K. Levy et al. Nov. 2, 1971
(2) U.S. Pat. No. 3,955,072 K. H. Johannsmeier May 4, 1976
(3) INSTRUMENT PRACTICE Nov., 1965 pp. 1011–1018
(4) U.S. Pat. App. Ser. No. 771,201 filed Feb. 23, 1977

BACKGROUND OF THE INVENTION

This invention relates to an apparatus for detecting an alignment pattern for a mask aligner or the like used in the production of large scale integration (LSI) devices.

Although this invention is applicable to mask aligners in general as will be described later, it is especially effectively used with a reduction-projection mask aligner (hereinafter referred to as RPA) as disclosed in U.S. patent application Ser. No. 771,201. The RPA will be first described below.

As an alignment pattern used with this RPA, at least three linear segments 2 perpendicular to each other are formed, for example, in the peripheral portion of a wafer 1 radially of the center thereof, as shown in FIG. 1A. In this pattern, when a photoresist 26 is coated by rotating the wafer 1, the photoresist only slightly moves outward by the centrifugal force but it is not displaced in a direction perpendicular to the longitudinal direction of the patterns as shown in FIG. 1B, resulting in a high accuracy of position detection. As seen from the foregoing description, the mask and the wafer are aligned to each other with the photoresist 26 0.8 to 1 mm thick coated on the wafer 1. As a result, when this coating is irradiated with a single-wavelength light ray such as the g-line having a wavelength of 0.43 μm, a multiplicity of interference fringes are produced due to the varying thickness of the photoresist 26 covering the pattern 2 as shown in FIG. 2A. The interference fringes are scanned in the direction of arrow by a photo-electric converter element such as for detecting the brightness of the interference fringes through photo-electric conversion by scanning pin holes or slits, or a TV camera, and are converted into an electrical signal, thereby producing a video signal 4 as shown in FIG. 2B.

In conventional apparatuses as disclosed in U.S. Pat. Nos. 3,617,751 or 3,955,072, an appropriate threshold value 5 is set beforehand, on the basis of which the video signal is converted into a binary signal 6 as shown in FIG. 2C, so that the center 7 between the binary signal pulses 6, namely, the center of the segment of the pattern is determined.

By this method, however, it is impossible to process a video signal 4a associated with a small linear pattern segment of the pattern 2 which fails to reach the threshold value 5 as shown in FIG. 2D. Further, in the case of a linear segment of the pattern associated with a video signal 4b not completely symmetric as shown in FIG. 2E, the conversion of the video signal into a binary signal with reference to the threshold value 5 results in the production of a binary signal 6b as shown in FIG. 2F. The center 7b of the binary signal pulses 6b is greatly displaced from the true center of the linear pattern segments, thereby making it impossible to determine the right centers of the linear pattern segments.

Still another disadvantage of the conventional apparatuses is that in the case where noise 8 included in the video signal 4c reaches the threshold level 5 as shown in FIG. 3A, the binary signal 6c shown in FIG. 3B is obtained, which binary signal 6c has a center 7c slightly displaced from the true center of the linear pattern segments. Furthermore, when the video signal 4d is slightly asymmetric due to some defect of the linear patterns segments themselves as shown in FIG. 4A, conversion of the video signal 4d into a binary signal with reference to the threshold value 5 results in a binary signal 6d as shown in FIG. 4B, thus making impossible the detection of the right center of the linear patterns.

SUMMARY OF THE INVENTION

An object of the present invention is to provide an alignment pattern detecting apparatus in which the effect of noise and other asymmetric factors included in the video signal detected by an image pick-up device is reduced, thereby detecting the center of the alignment pattern segments on the wafer with high accuracy.

According to the present invention, there is provided an alignment pattern detecting apparatus comprising an image pick-up device for picking up while scanning an optical image of an alignment pattern formed on the wafer, and means for determining the degree of matching of the video signal obtained from the image pick-up device with the same signal returned at a predetermined point in order to determine a point associated with best degree of matching. The point determined by that means is detected as the center of the alignment pattern, thereby reducing the effect of noise and asymmetric factors.

BRIEF DESCRIPTION OF THE DRAWINGS

FIG. 5 is a schematic diagram showing the configuration of an embodiment of the alignment pattern detecting apparatus according to the present invention.

FIG. 6A is a diagram showing a video signal produced by the image pick-up device shown in FIG. 5.

FIG. 6B is a diagram showing the manner of sample-hold by the sample-hold circuit included in FIG. 5.

FIG. 6C is a diagram indicating the value of the asymmetric function $z_1(x_i)$ obtained by the operation circuit of FIG. 5.

DESCRIPTION OF THE PREFERRED EMBODIMENTS

Figure 1A:
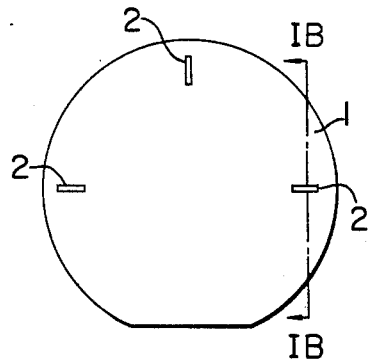
FIG. 1A is a diagram showing an example of an alignment pattern formed on the wafer.
Figure 1B:
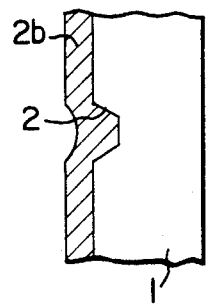
FIG. 1B is a sectional view, taken along line IB—IB, of an alignment pattern coated with a photoresist.
Figure 2A:
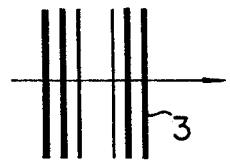
FIG. 2A is a diagram showing interference fringes formed by radiating a single-wavelength light ray on the alignment pattern coated with the photoresist.
Figure 2B:
FIG. 2B is a diagram showing a video signal waveform produced from the optical image of FIG. 2A picked up by an image pick-up device.
Figure 2C:
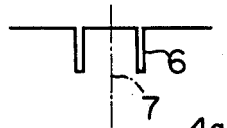
FIG. 2C is a diagram showing a binary signal waveform into which the video signal is converted on the basis of a predetermined threshold value by a conventional method.
Figure 2D:
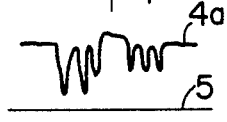
FIG. 2D is a diagram showing a waveform of a video signal smaller in level than the threshold value.
Figure 2E:
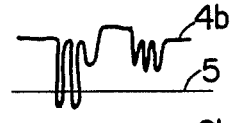
FIG. 2E is a diagram showing an asymmetric video signal waveform.
Figure 2F:
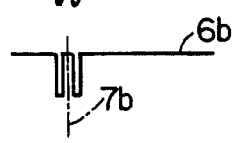
FIG. 2F is a diagram showing a binary signal waveform into which the video signal shown in FIG. 2E is converted with reference to the threshold value.
Figure 3A:
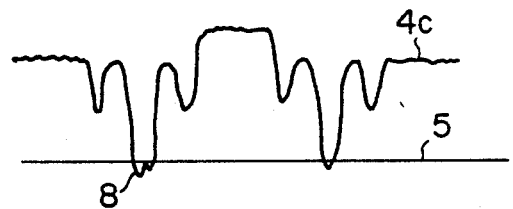
FIG. 3A is a diagram showing a video signal waveform carrying noise.
Figure 3B:
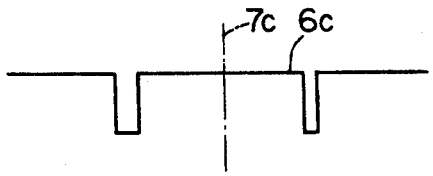
FIG. 3B is a diagram showing a binary signal waveform into which the video signal of FIG. 3A is converted with reference to the threshold value.
Figure 4A:
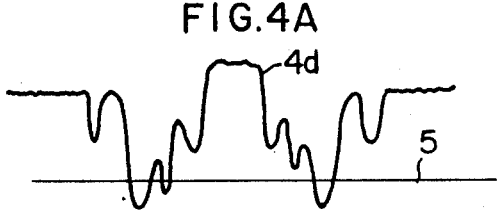
FIG. 4A is a diagram showing an asymmetric video signal waveform detected as a result of an error of the alignment pattern.
Figure 4B:
FIG. 4B is a diagram showing a binary signal waveform into which the video signal of FIG. 4A is converted with reference to the threshold value.

The configuration of an embodiment of the alignment pattern detecting apparatus according to the present invention is schematically shown in FIG. 5. Reference numeral 9 shows an image pick-up device for picking up while scanning an optical image of an alignment pattern such as a linear one or a linear pattern segment formed on a wafer 1, the output of which is amplified by an amplifier 19 having an operational amplifier 20 for producing a time-base video signal of a waveform shown in FIG. 6A. The scanning is in a direction transverse to, preferably almost perpendicular to, the lengthwise direction of the linear pattern. The image pick-up device 9 is disclosed in detail in the U.S. patent application Ser. No. 771,201. The image pick-up device 9 takes the form of, say, a device with pin holes or slits arranged on the front of a photo-electric converter element, a TV camera with the scanning capability or a photo-diode array. Numeral 10 shows a sample-hold circuit including field-effect transistors 21 and 22, an operational amplifier 23, a capacitor C and a resistor $R_4$. As shown in FIG. 6B, a signal is sampled at regular intervals at sampling points $x_1, x_2, \ldots, x_n$ and the sampled values $y_1, y_2, \ldots, y_n$ are held. Numeral 11 shows a sampling signal generator for producing a signal for sampling the output of the field-effect transistors 21 and 22 of the sample-hold circuit 10. Numeral 12 shows an A/D converter for converting the analog signal held by the sample-hold circuit 10 into a digital signal. Numeral 13 shows a memory for temporarily storing the digital signals $y_1, y_2, \ldots, y_n$ produced by the A/D converter 12. Numeral 14 shows an operation circuit for determining the symmetric relation $z_1(x_i)$ shown in equation (1) below with reference to a sampling point $\pm j$ by using the point $x_i$ as a return point.

$$z_1(x_i) = \sum_{j=1}^{m} |y(x_i - j) - y(x_i + j)|^\gamma \quad (1)$$

where $\gamma$ is a natural number. When $\gamma$ is 1, the accuracy is not very high, while if it is 2 or more it is easier to find a minimum point thereby to increase the accuracy. In equation (1) above, $m$ shows a value determined in an optimum way taking into consideration the size of the alignment pattern on the wafer 1 involved, as shown, for example, in FIG. 6B.

Figure 7:
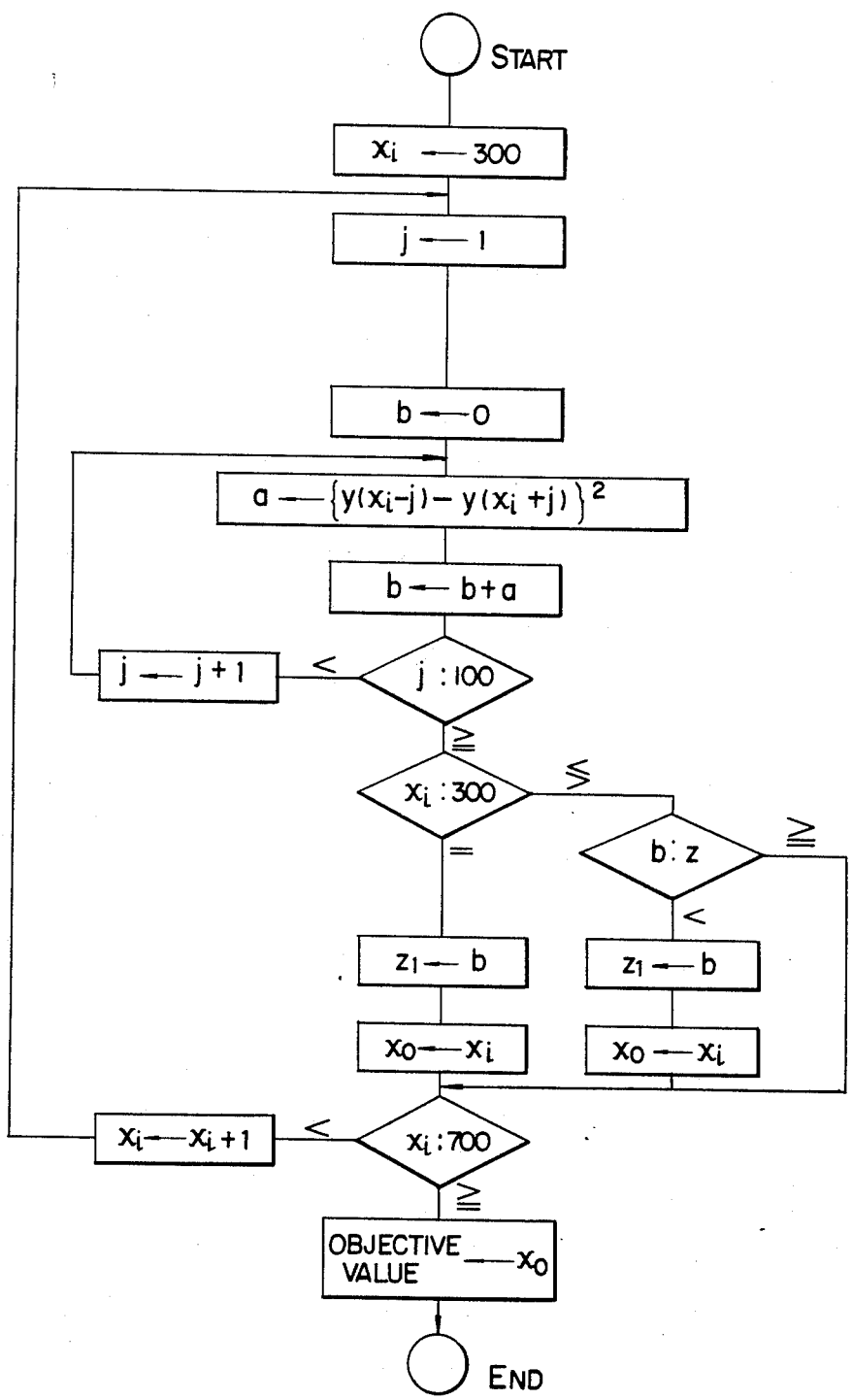
FIG. 7 is a flow chart for the operation circuit shown in FIG. 5.

Further, the operation circuit 14 changes the symmetric return point $x_i$ in sequence; $x_1, x_2, \ldots, x_n$ thereby to determine the symmetric function $z_1(x_i)$ as shown in FIG. 6C, thus determining the symmetric return point $x_0$ representing the minimum value of the function $z_1(x_i)$. Assuming that $n$ is 2000, for instance, the memory 13 has 2000 addresses in which the digital values $y_1$ to $y_{2000}$ converted by the A/D converter 12 are stored. Also, assume that the center point $x_i$ of the signal is determined between the 300th and 700th addresses, that $m$ is the 100th address and that $\gamma$ is 2. Accordingly, the operation circuit 14 performs the operation thereof in accordance with the flow chart shown in FIG. 7. In other words, with $x_i$ as 300, the operation is started from the 300th address as shown below.

$a \longleftarrow \{y(299) - y(301)\}^2$ $\downarrow$ $b \longleftarrow \{y(299) - y(301)\}^2$ $\downarrow$ $a \longleftarrow \{y(298) - y(302)\}^2$ $\downarrow$ $b \longleftarrow \{y(299) - y(301)\}^2 + \{y(298) - y(302)\}^2$ $\vdots$ $b \longleftarrow \{y(299) - y(301)\}^2 + \{y(298) - y(302)\}^2 + \ldots$
$\ldots + \{y(200) - y(400)\}^2$ Thus, the calculations are made for $j$ from 1 to 100, while at the same time calculating $$z_1(300) = \sum_{j=1}^{100} |y(300 - j) - y(300 + j)|^2.$$

This calculation result is the first value where $x_i = 300$. Under this condition, $z_1 \leftarrow b$ and $x_o \leftarrow 300$. Although $x_i < 700$, $x_1 \leftarrow 300 + 1$ and the calculations are repeated. Under this condition, the value of $b$ is $$b \longleftarrow \sum_{j=1}^{100} |y(301 - j) - y(301 + j)|^2$$

Further, since $x_i \approx 300$, the value $b$ is compared with the value $z_1$ obtained earlier, and the smaller one is assumed always as $z_1$, where $x_i$ is assumed to be $x_0$. As a result, $z_1$ always takes the minimum value, and $x_0$ represents the address $x_i$ under that condition. When the calculation is completed with $x_i$ being equal to or larger than 700, $x_0$ is an address giving the minimum value which is a symmetric return point indicating the minimum value.

In other words, alignment linear pattern segments on the wafer 1 are picked up by the image pick-up device 9 and converted into a video signal 4. The video signal 4 is sampled and held at regular intervals by the sample-hold circuit 10. The signals $y_1, y_2, \ldots, y_n$ thus held are converted into the digital signals $y_1, y_2, \ldots, y_n$ by the A/D converter 12. The digital signals $y_1, y_2, \ldots, y_n$ are processed in the operation circuit 14 so that with reference to the sampling point $\pm j$, the symmetric function $z_1(x_i)$ shown in equation (1) is obtained with the symmetric return point $x_i$ as the center as shown in FIG. 6B, by changing the symmetric return point $x_i$ in sequence; $x_1, x_2, \ldots, x_n$. As shown in FIG. 6C, the return point $x_0$ representing the minimum value of the function $z_1(x_i)$ is obtained. The symmetric return point $x_0$ represents one associated with the best return pattern matching and hence the true position of the alignment pattern.

Figure 8:
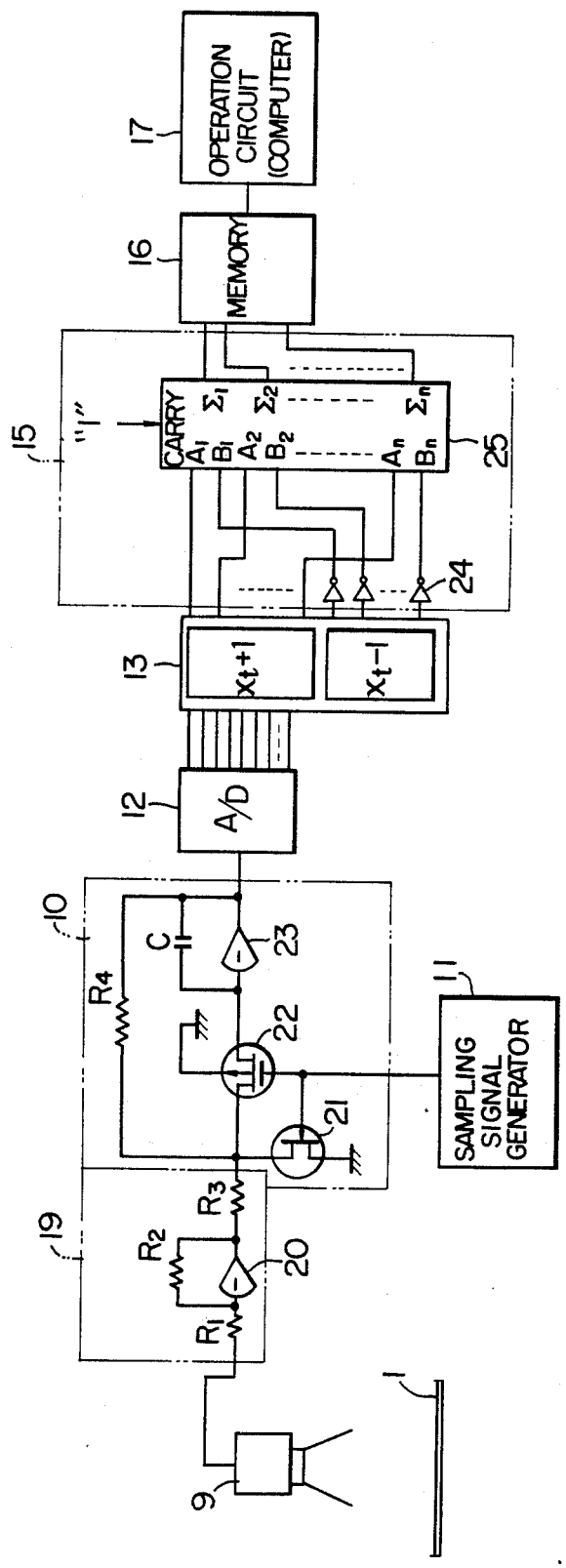
FIG. 8 is a schematic diagram showing the configuration of another embodiment of the alignment pattern detecting apparatus according to the present invention.
Figure 9A:
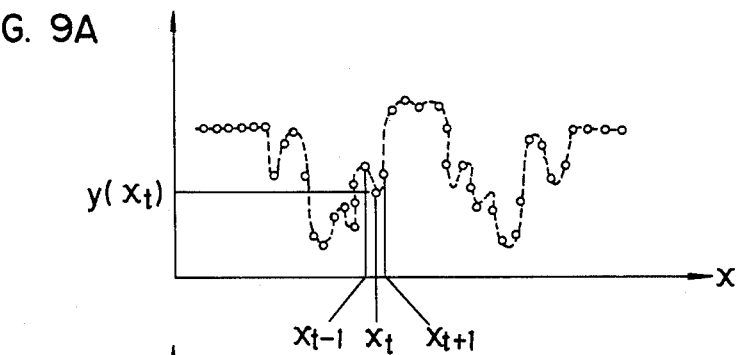
FIG. 9A is a diagram showing the manner of sample-hold by the sample-hold circuit shown in FIG. 8.

In the above-mentioned apparatus, the return pattern matching operation is performed by use of the original video signal 4. This apparatus may be affected by large variations of the signal as a whole. An apparatus improved in this aspect is shown in FIG. 8. Reference numerals 1, 9, 10, 11, 12 and 13 show like component elements in FIG. 5. Numeral 15 shows a differential operation circuit for effecting the differential operation of the digital signal stored in the memory 13 by the equation (2) below and for converting the signal of FIG. 9A into the difference signal of FIG. 9B. The differential operation circuit 15 includes, for example, an inverter 24 for inverting the signal of $y(x_t - 1)$ stored at $(x_t - 1)$, and a full adder 25 for adding the respective signals to each other.

$$d(x_t) = y(x_t + 1) - y(x_t - 1) \tag{2}$$

Figure 9B:
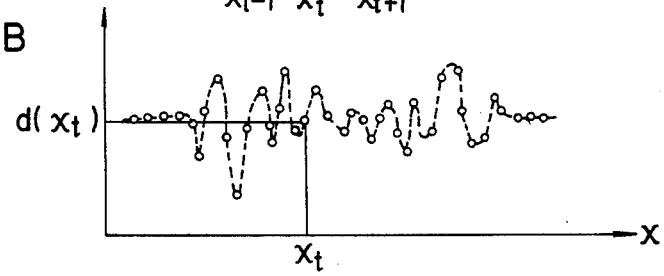
FIG. 9B is a diagram showing a difference signal waveform produced from the differential operation circuit of FIG. 8.
Figure 9C:
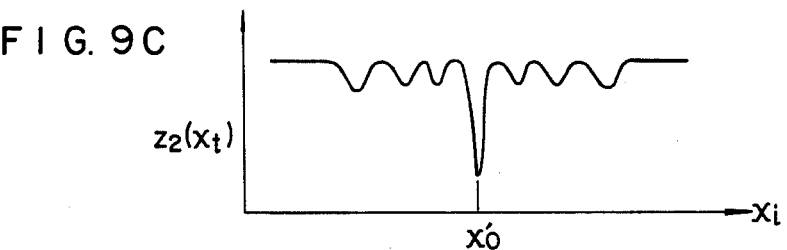
FIG. 9C is a diagram showing the value of the asymmetric function $z_2(x_i)$ obtained from the operation circuit included in FIG. 8.

Numeral 16 shows a memory for storing the result $d(x_t)$ of the calculation effected in the differential operation circuit 15. Numeral 17 shows an operation circuit for determining the symmetric function $z_2(x_i)$ shown in equation (3) with reference to the sampling point $\pm j$ by using the symmetric return point $x_i$ as the center.

$$z_2(x_i) = \sum_{j=1}^{m} |d(x_i - j) + d(x_i + j)|^\gamma \tag{3}$$

where $\gamma$ is a natural number, which, if 2 or more, assures a high accuracy. Further, the operation circuit 17 changes the symmetric return point $x_i$ in sequence; $x_1, x_2, \ldots, x_n$ and determines the symmetric function $z_2(x_i)$ as shown in FIG. 9C, thus determining the symmetric return point $x_0'$ representing the minimum value of the function $z_2(x_i)$. In this way, the alignment linear pattern segments on the wafer are picked up by the image pick-up device 9 and converted into the video signal 4 shown in FIG. 6A. This video signal 4 is sampled and held at regular intervals by the sample-hold circuit 10. The sampled and held signals $y_1, y_2, \ldots, y_n$ are coverted into digital signals $y_1, y_2, \ldots, y_n$ by the A/D converter 12. From these digital signals $y_1, y_2, \ldots, y_n$, difference $d(x_t)$ shown in equation (2) is produced by the differential operation circuit 15. This difference signal $d(x_t)$ is processed in the operation circuit 17 in such a manner that as shown in FIG. 9B, the symmetric function $z_2(x_i)$ shown in equation (3) is obtained with reference to the sampling point $\pm j$ by changing the symmetric return point $x_i$ in sequence; $x_1, x_2, \ldots, x_n$. Thus the return point $x_0'$ representing the minimum value of $z_2(x_i)$ obtained as shown in FIG. 9C is determined. By differentiating the video signal in that way, the center position of the alignment pattern is determined with high accuracy in spite of any large variation of the video signal. In the last-mentioned embodiment, the differentiation is effected after sample-holding and analog-to-digital conversion. However, alternately, after the differentiation operation, the sample-holding and analog-to-digital conversion may be effected with equal effect as the foregoing embodiment.

Although the embodiments described above involve patterns accompanied by a multiplicity of interference fringes taking the reduction-projection type of aligner into consideration, the present invention may be applied with equal effect to pattern detection system of another type such as the close contact type of aligner. The detection of a pattern on the wafer in the close contact type of aligner requires no light ray of single wavelength as in the projection type but white light suffices. As a result, no interference fringes occur although the detection signal itself becomes smaller. For this reason, the problems of misalignment or erroneous detection occur frequently as explained with reference to the problem points of the conventional methods.

Figure 10A:
FIG. 10A is a diagram showing an alignment pattern including two parallel linear segments.
Figure 10B:
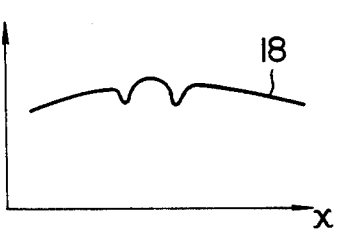
FIG. 10B is a diagram showing a video signal waveform obtained by radiating white light onto the alignment pattern of FIG. 10.

The case where an alignment pattern includes two linear segments arranged on the wafer is shown in FIG. 10A, and the waveform of the video signal 18 obtained from the image pick-up device 9 as a result of radiation of white light onto the linear segments is illustrated in FIG. 10B. The present invention is applied very effectively also to such a video signal 18 and not limited to the pattern forms illustrated in the embodiments mentioned earlier.

It will be understood from the foregoing description that according to the present invention, the accuracy of detection of the pattern on the wafer is increased from the conventional order of 0.3 $\mu$m to the higher order of 0.1 $\mu$m. Further, the detection reliability is improved, thereby leading to the great advantage that the production of the large scale integration device with the line thickness of 2 $\mu$m is made possible.

We claim:

1. An alignment pattern detecting apparatus comprising an image pick-up device for scanning and picking up an optical image of a registration pattern formed on a wafer, the direction of the scanning being in a direction transverse to the lengthwise direction of the pattern, and means for symmetrically returning a video signal obtained from said image pick-up device to determine the degree of matching of said video signal with the video signal returned and for determining a return point associated with the best matching to detect said return point as the center of said alignment pattern.

2. An alignment pattern detecting apparatus according to claim 1, in which said means operates in such a manner that said video signal is sampled at regular coordinate intervals thereby to determine the associated signal levels $y(x_1)$ to $y(x_n)$, said signal levels $y(x_1)$ to $y(x_n)$ being returned symmetrically at a predetermined point $(x_i)$ thereby to determine the symmetric function $$z_1(x_i) = \sum_{j=1}^{m} |y(x_i + j) - y(x_i - j)|^\gamma$$

where $\gamma$ is a natural number and $m$ a given natural number, thereby determining a point representing the minimum value of said symmetric function $z_1(x_i)$.

3. An alignment pattern detecting apparatus according to claim 2, in which said value $\gamma$ is not less than two.

4. An alignment pattern detecting apparatus according to claim 1, in which said means operates in such a manner that said video signal is sampled at regular coodinate intervals thereby to determine the associated signal levels $y(x_1)$ to $y(x_n)$, said means producing a difference signal $d(x_i)$ of said signal levels $y(x_1)$ to $y(x_n)$, said difference signal being returned at a predetermined point $(x_i)$ thereby to determine the symmetric function $$z_2(x_i) = \sum_{j=1}^{m} |d(x_i + j) + d(x_i - j)|^\gamma$$

where $\gamma$ is a natural number and $m$ a given natural number, thereby determining a point representing the minimum value of said symmetric function $z_2(x_i)$.

5. An alignment pattern detecting apparatus according to claim 4, in which said value $\gamma$ is not less than two.

* * * * *